United States Patent [19]
Oliphant

[11] 3,784,720
[45] Jan. 8, 1974

[54] VARIABLE VISIBILITY SIMULATOR

[75] Inventor: Melvain Oliphant, Binghamton, N.Y.

[73] Assignee: The Singer Company, New York, N.Y.

[22] Filed: Sept. 14, 1970

[21] Appl. No.: 71,983

[52] U.S. Cl. .................................. 35/12 N, 353/35
[51] Int. Cl. .......................... G09b 9/08, B64g 7/00
[58] Field of Search ..................... 35/12 N; 353/34, 353/35; 178/7.2 E

[56] References Cited
UNITED STATES PATENTS

| 3,260,152 | 7/1966 | Aston | 355/71 |
|---|---|---|---|
| 2,431,824 | 12/1947 | Poch | 178/7.2 E |
| 2,975,670 | 3/1961 | Hemstreet | 35/12 N X |
| 3,472,587 | 10/1969 | Liguori | 353/34 |
| 3,508,345 | 4/1970 | Dietrich et al. | 35/12 N |
| 3,336,681 | 8/1967 | Minasy | 353/35 X |
| 3,258,855 | 7/1966 | Flower et al. | 35/12 N |
| 3,436,840 | 4/1969 | Noxon | 35/12 N |
| 3,427,730 | 2/1964 | Noxon | 35/12 N |
| 3,548,515 | 12/1970 | Simon | 35/12 N |
| 3,541,584 | 11/1970 | Simon et al. | 35/12 N |
| 3,541,704 | 11/1970 | Simon et al. | 35/12 N |

Primary Examiner—Robert W. Michell
Assistant Examiner—L. R. Oremland
Attorney—Francis L. Masselle, William Grobman and Charles S. McGuire

[57] ABSTRACT

Apparatus to simulate the effects of fog or the like in a film projection visual system. The effects are obtained by placing a fog mask mounted on a moveable holder in the path of the projected image between the film and projection lens. By controlling the vertical position of the mask and holder various degrees of visibility may be simulated.

3 Claims, 7 Drawing Figures

$$1414 = \sqrt{1500^2 - 500^2}$$

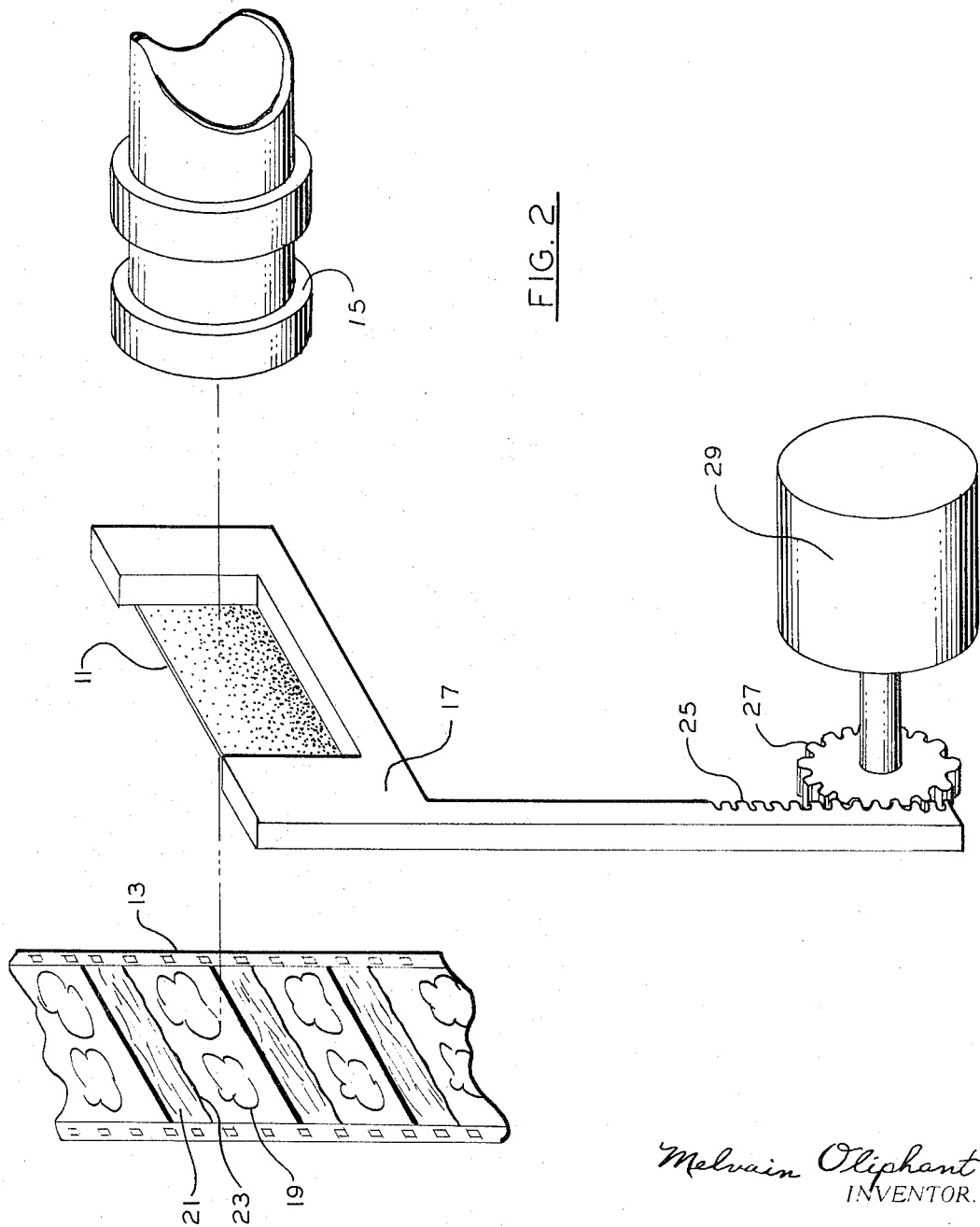

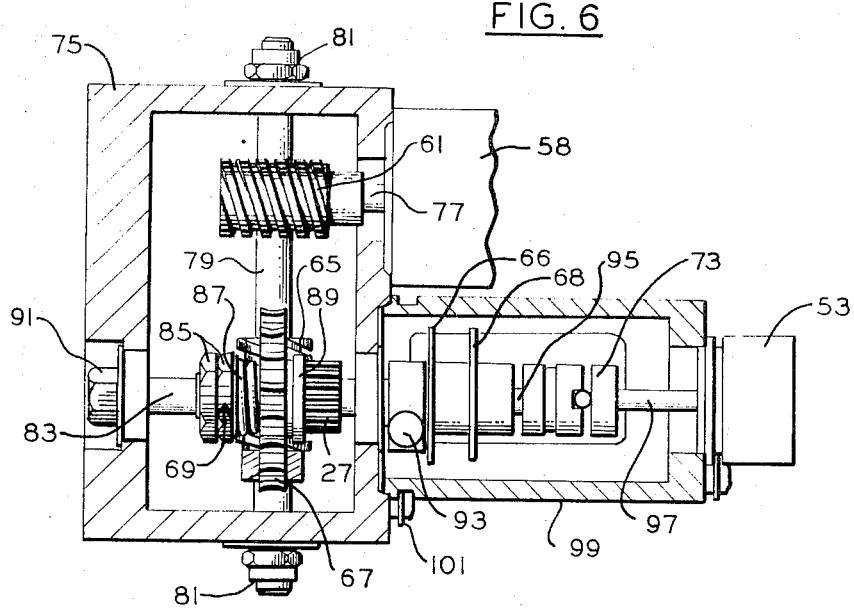
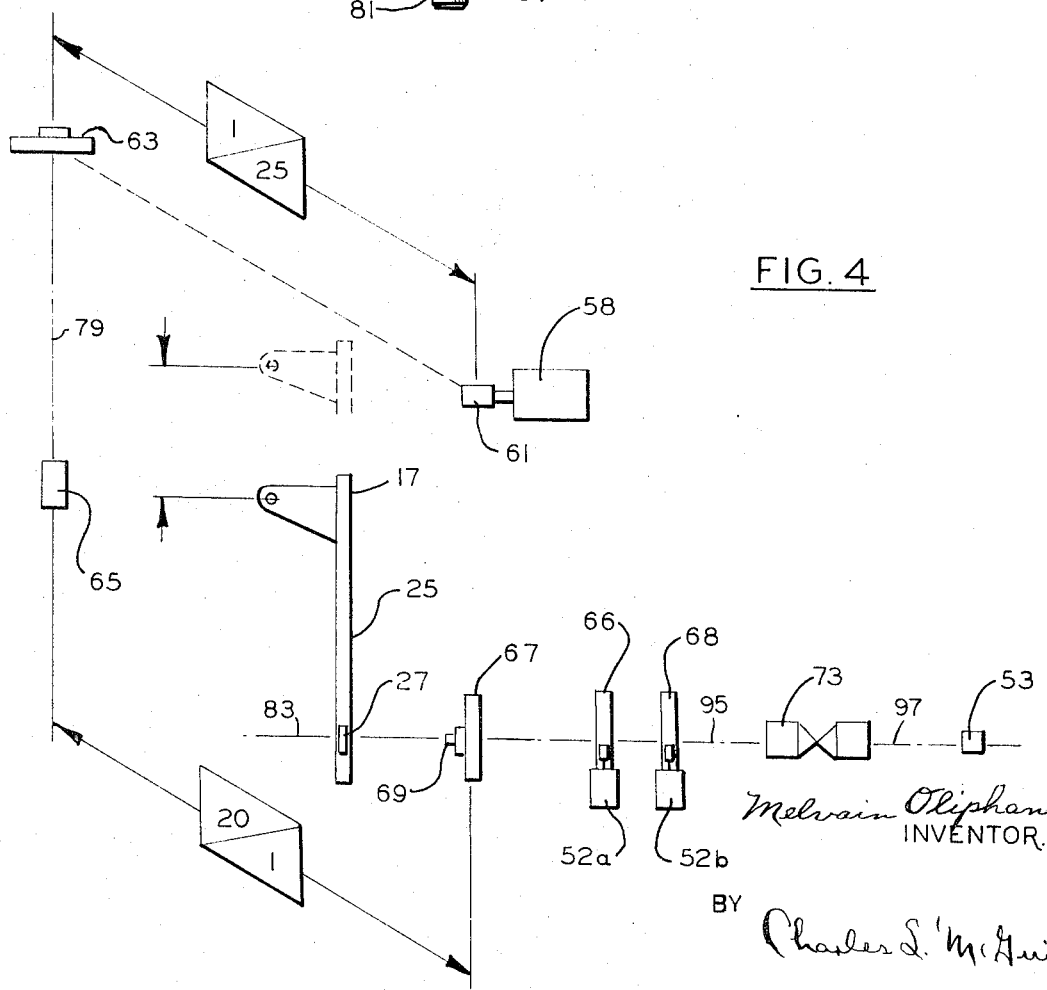

VARIABLE VISIBILITY SIMULATOR

This invention relates to visual systems and more particularly to apparatus which provides variable visibility to simulate the effect of fog, or the like, in film projection visual system.

The demand for visual systems in aircraft simulators has increased in recent years, particularly those for use in takeoff and landing training. The two most common types of systems used for takeoff and landing training are the camera-model system and the motion picture projection system. In one embodiment of the latter a film, photographed while making a controlled takeoff or landing, is played back to the trainee with proper perspective transformation introduced when he deviates from the controlled flight path. The manner in which such a system may be constructed is described, for example, in U.S. Pat. Nos. 3,261,912 and 3,240,120 granted to H. S. Hemstreet and assigned to the same assignee as the present invention.

In landing training particularly it is desirable to train the pilot under varying conditions of visibility. One of the most important skills to be developed is that of transferring from instrument flying to visual flying at the point where the runway becomes visible during an ILS approach under conditions of low visibility. It is therefore desirable to provide in visual simulation the capability of simulating varying conditions of visibility.

Previous methods of training pilots in this type of flying have utilized fog masks placed between the pilot and the scene he is viewing, usually in the actual aircraft. Such masks could be used in a simulator having a film projection system but they must either be of a large size or must be on a device worn by the pilot. The former has the disadvantage of difficulty in controlling its position and the latter may be distracting to the pilot. Another way of obtaining the desired result is to make numerous films under the different visibility conditions. This has the disadvantage of the time involved in waiting for proper conditions and the expense of making the films. Likewise, a mask could be placed in the optical path of the viewing camera, as has been done in camera-model systems, or alternatively the effects could be introduced during processing. In any case, the film expense is high. The present system avoids these problems by placing a fog mask in the optical path of the projector close to the film where it may be of small size and easily controlled. Thus with the fog mask of the present invention one film may be used under all conditions of visibility.

It is the primary object of this invention to provide apparatus which will simulate a variety of visibility conditions in a film projection system.

Another object is to provide apparatus which will simulate variable visibility in any projection system.

An additional object is to provide an improved visual system for use in flight simulators.

Other objects will in part appear hereinafter and will in part be obvious.

The invention accordingly comprises the features of construction, combination of elements, and arrangements of parts, which will be exemplified in the construction hereinafter set forth, and the scope of the invention will be indicated in the claims.

For a fuller understanding of the nature and objects of the invention reference should be had to the following detailed description taken in connection with the accompanying drawings in which:

FIG. 2 is a somewhat diagrammatic perspective view showing positional relationships pertinent to operation of the preferred embodiment of the invention;

FIG. 4 is a mechanical schematic drawing of the drive system in the preferred embodiment;

FIG. 6 is a side view in section on the line 6—6 of FIG. 5

Figure 1:
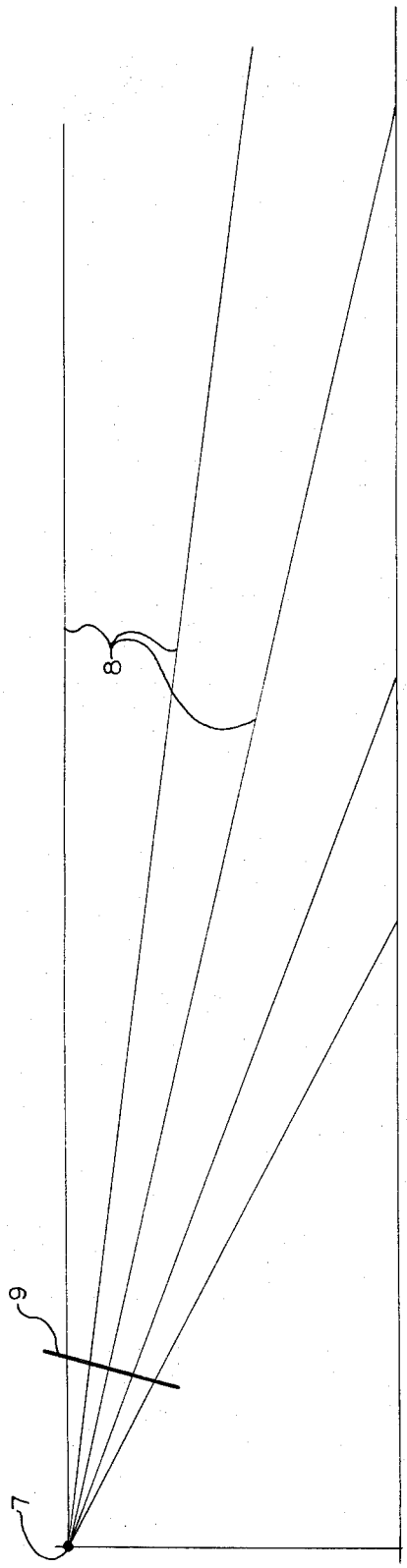
FIG. 1 is an illustration of how lines of sight map on an aircraft window or film frame.

The degree to which a scene being viewed is obscured by fog is dependent upon the amount of fog between the observer and the object being viewed. In an actual case the density of the fog will vary, but for simulation purposes it may be assumed to be uniform. The distance to any object which may be observed by a pilot in an aircraft will vary from a distance equal to his altitude, for objects directly below him, to infinity at the horizon. This is illustrated in FIG. 1 where the slant range lines of sight 8 from an observer's eye point 7 are shown. It can be seen that equal distances between lines 8 at the window plane 9 will represent increasingly longer slant ranges as the observer scans from nadir to the horizon. The relationship between the position in the window plane and the distance to an object on the ground can be approximated by a hyperbola as is indicated in U.S. Pat. No. 3,508,345 to A.K. Dietrich et al. Window plane 9 could also represent the plane of a photograph of the same scene. Thus, it can be seen that the superposition of a fog mask having the proper hyperbolic function can be used to represent the attenuation of the scene by fog. Such a fog mask can be constructed using the methods disclosed in the Dietrich et al. patent mentioned above. The fog mask so constructed will be nearly transparent at the bottom and will become increasingly dense in a hyperbolic manner as the top is approached. The top portion will completely obscure the scene, simulating zero visibility.

FIG. 2 shows the arrangement of the fog mask in the projection path. The fog mask 11 held by holder 17 is placed in the path of the image as it is projected from film 13 to projection lens 15. The film 13 in the film gate is upside down with the sky portion 19 on the bottom and the ground portion 21 on the top, the projection image, of course; the image is inverted and appears upright to the observer. The line 23 represents the horizon. Fog mask 11 is placed at a position between the film and lens where its top edge is in focus, thus allowing the area fogged to blend with the clear area in the scene displayed on the projection surface (not shown).

The vertical position of the fog mask 11 may be adjusted by movement of holder 17 which has mounted on it a rack 25 driven by pinion 27. Pinion 27 is ultimately driven by motor 29, a portion of a servo system described later, through a mechanical gearing and linkage arrangement shown in detail in FIGS. 5 & 6. Sufficient movement is provided to allow the fog mask to obscure all or any portion of the film frame, thus providing continuously variable fog simulation from full visibility to zero visibility. Positioning of holder 17 in a fully down position allows the scene to be viewed without fog; as the mask 11 is moved up by holder 17 the effect of a progressive reduction of visibility occurs. Due to image inversion, this effect as viewed will be of fog moving down on the screen, gradually obscuring more of the projected image. As the fog mask has a gradient in the vertical direction which is a hyperbolic function, as explained in the referenced patent, and as the edge is not in focus, the effect is to gradually obscure more of the projected scene as the distance to the portion of the image being observed increases.

Figure 3A:
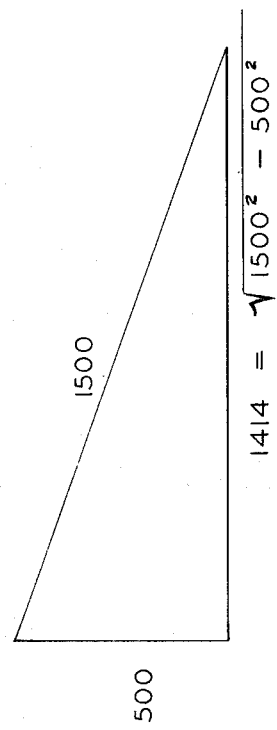
FIG. 3a is a trigonometric diagram illustrating the computation of a ground range.
Figure 3:
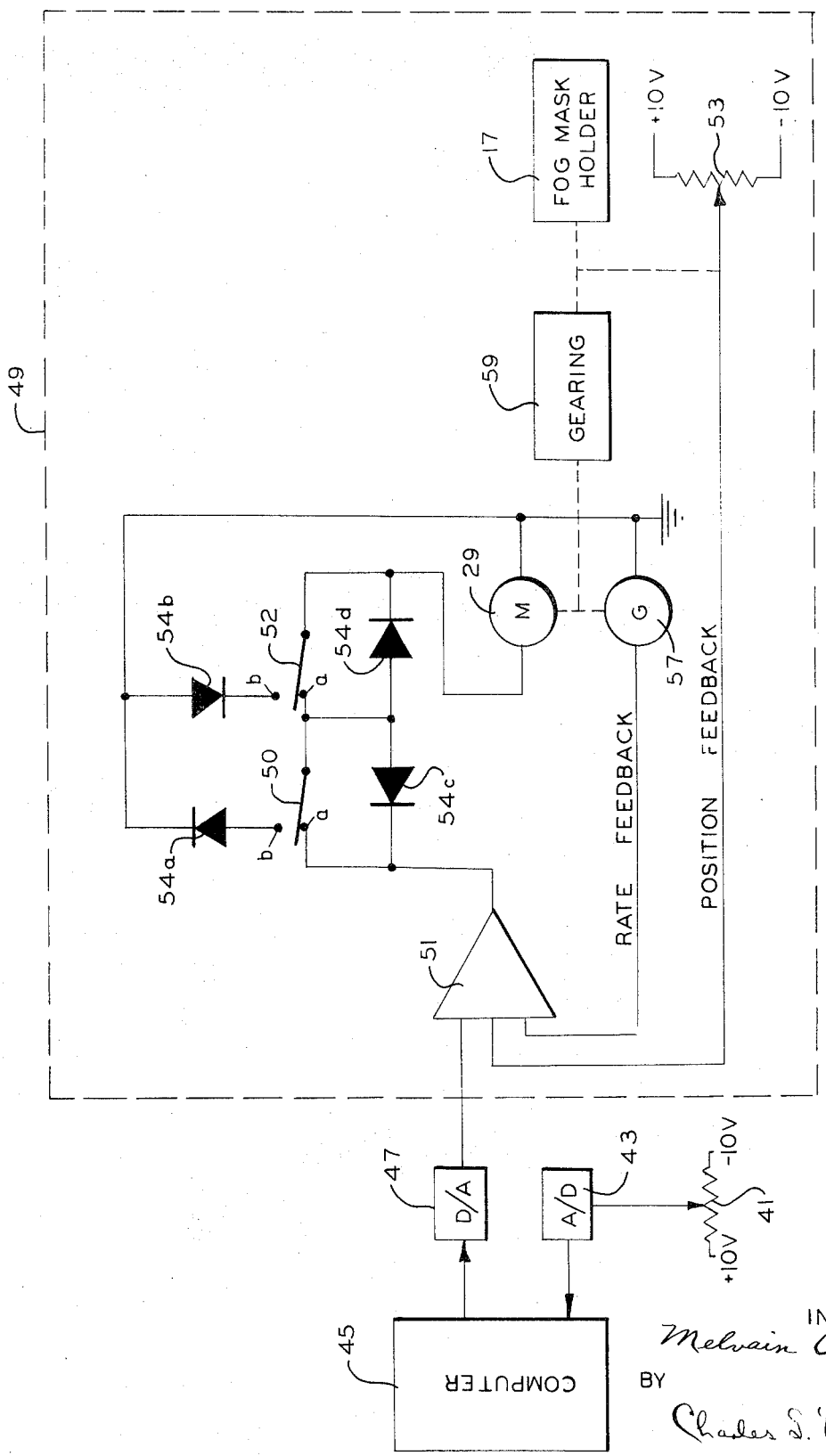
FIG. 3 is a block diagram of the fog mask servo drive system.

FIG. 3 illustrates the servo system used to drive the fog mask. Potentiometer 41 is located at the instructor's station for the simulator and is set manually by the instructor to the desired visibility range, e.g., 1 mile, 1,500 ft., 2,000 ft., etc. This range is in terms of runway visibility range (RVR) and represents the slant range to a point on the runway. The relationship between voltage and visibility may be a linear or non-linear function depending on the needs of the simulator. In a linear system, for example, each 1 volt increment could represent 1,000 ft. of visibility, in which case visibility could be varied from 0 to 20,000 ft. over the 20 volt ($-10v$ to $+10v$) range in the illustrated example of the potentiometer. The output of potentiometer 41 is an input to analog to digital converter 43, which converts the signal to digital form for input to computer 45. In computer 45 value is used in an equation, also having as a term the altitude of the aircraft, to compute an output position for the fog mask. For example, if the aircraft is flying at 500 ft. on a landing approach and the RVR is 1,500 ft., the mask is positioned so that the portion of the displayed image representing a point 1,414 ft. away on the ground from a point directly below the simulated aircraft position is just be visible, as shown on FIG. 3a. Points further away will be obscured completely. Closer points of course will be progressively more distinctly visible due to the density gradient of fog mask 11.

Thus, in order to position the mask properly for the desired range of visibility, the only terms in the equation are the height of the aircraft and the selected RVR, together with an appropriate scaling constant applicable to the servo. The instantaneous height of the aircraft is a value computed in the standard flight computer associated with virtually all aircraft trainers and simulators in accordance with inputs from the controls and pre-programmed aerodynamic characteristics of the particular aircraft simulated. The RVR value, as previously mentioned, is represented by the selective setting of a potentiometer by the instructor. From these two values, the length of the third side and angular functions of the triangle shown in FIG. 3a may be easily computed. The required fog mask position is achieved by providing a servo drive signal which brings the mask to a position where visibility of points on the projected scene more distant from the aircraft than the selected RVR are obscured. This signal may be expressed, for example, as the tangent of the slant range angle, i. e., the complement of the angle between the 500 and 1500 sides of the FIG. 3a triangle. The value of the tangent of this angle is, in the illustrated example, 500/1414; in the general case, this is the height of the aircraft divided by the square root of the sum of the squares of the height of the aircraft and the RVR. Therefore, the servo drive signal may be expressed as the tangent multiplied by the servo scaling constant. Conventional electronic components may be used to perform the required arithmetic operations. If desired, upper and lower limiting constants may also be used for driving the fog mask servo to provide total visibility or total obscuration of the scene.

The output of digital to analog converter 47 is a position input to the position servo systems designated generally as 49, which drives the fog mask. This is a standard type of position servo well known in the art. The position input is summed in amplifier 51 with a signal from follow-up potentiometer 53 which is mechanically connected to the mask drive. A change of input voltage to amplifier 51 will cause an output to motor 29 which drives the mask and follow-up potentiometer 53 in a direction to cause the voltage from potentiometer 53 to null out the input position signal. A signal from generator (or tachometer) 57 provides rate feedback to amplifier 51 to render the system stable. The output of motor 29 is mechanically connected through gearing 59 to the mask holder 17 as explained below.

To prevent motor 29 from driving the holder 17 into its mechanical limits, cam operated limit switches 50 and 52 in combination with diodes 54a, 54b, 54c and 54d are provided. The arrangement supplies electrical limits which when actuated prevent the holder from driving in the direction of an engaged mechanical stop but still permits the holder to be driven away from the stop. Switches 50 and 52 each has a pair of fixed contacts a and b and are normally closed on respective contacts a so that a circuit is completed through the switches from amplifier 21 to motor 29 while the mask holder 17 is positioned anywhere between and spaced from its mechanical stops. However, if the holder 17 is driven to the position limit, the moving contact of switch 50 will be moved by a cam, as will be seen below, from fixed contact a to fixed contact b; the positive voltage no longer has a path to the motor and any positive voltage at the motor input is grounded through diode 54a assuring that the motor does not drive further in a positive direction. But, if a negative voltage, which would tend to drive the holder away from the positive stop, is applied it has a path through diode 54c and switch 52 so as to energize motor 29. Likewise, if the negative limit is reached only positive voltages will be able to reach the motor.

FIG. 4 is a mechanical schematic of the drive system. Motor-generator 58, which is a package including motor 29 and generator 57, has on its output shaft a worm gear 61 which drives a worm wheel 63 fixed to a common shaft 79 with a worm gear 65. Worm gear 65 drives a worm wheel 67 which is rotatable on shaft 83 and connected through a clutch 69 (a standard spring loaded friction clutch) to spur gear or pinion 27 fixed to same shaft. Also located on this shaft 83 with spur gear 27 are cams 66 and 68 which operate limit switches 50 and 52. A flexible coupling 73 connects the shaft follow-up potentiometer 53. Spur gear 27 engages and drives rack 25 on which holder 17 is mounted.

Figure 5:
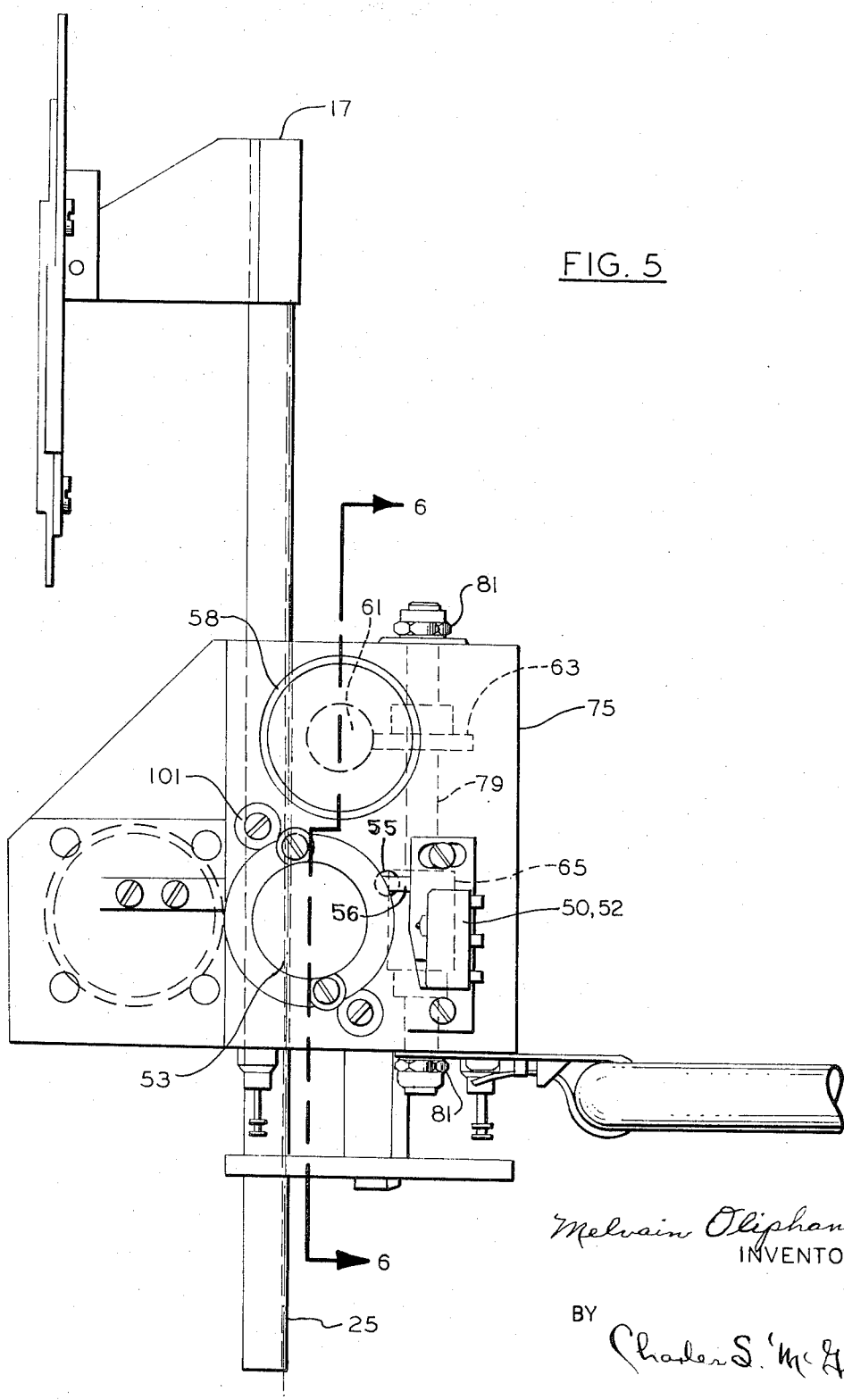
FIG. 5 is a detailed mechanical drawing of an elevational view of this embodiment.

FIGS. 5 and 6 show the details of the drive mechanism. Motor-generator 58 is fastened to casing 75 with its shaft 77 passing through the casing wall. Fixedly mounted on the end of shaft 77 is worm gear 61 which engages worm wheel 63 (FIG. 5) fixedly mounted on shaft 79 which is journaled in the upper and lower casing walls and secured at each end by a nut 81 to keep it properly axially positioned in casing 75. Also fixed to shaft 79 is worm gear 65 which engages worm wheel 67, the latter being coupled to shaft 83 through clutch 69. Clutch 69 comprises nuts 85 and spring 87. Tightening of the nuts 85 compresses spring 87, pressing worm wheel 67 against the collar 89 of spur gear 27 fixed on shaft 83. If the normal load which is preset by adjusting nuts 85, on spur gear 27 is exceeded, worm wheel 67 will slip against the collar. As previously explained, spur gear 27 drives holder 17 on which the mask is mounted. Shaft 83 passes through the two sides of and is rotatably supported by the casing 75. Proper axial positioning is maintained by coupling 93 on one side of the casing and nut 91 on the other.

An assembly 99 containing cams 66 and 68 and limit switches 50 and 52 is mounted to one side of casing 75 and held by fasteners 101 which fit in the grooves on assembly 99. The limit switches 50,52 each have a cam follower wheel 55 (one shown) mounted and rotatable on a support 56 fastened to the switch mechanism. The cam followers 55 ride on the cams 66 and 68 causing actuation of their respective switches when a high spot occurs on the cam on which they are riding. The shaft 95 in this assembly on which the cams 66 and 68 are mounted is connected to shaft 83 with coupling 93. The cams are secured with set screws and may be rotatively adjusted to properly limit motion of holder 17. On the other end of shaft 95 flexible coupling 73, having only lateral and not rotational flexibility, connects shaft 95 to shaft 97 of potentiometer 53. Potentiometer 53 is attached to assembly 99 in the same manner the assembly is mounted on the casing. It will be seen that the rotational coupling of potentiometer 53 to spur gear 27 (the drive gear) is essentially rigid and will accurately reflect the position of holder 17 even if clutch 69 slips.

It can be seen then, that by placing a properly constructed fog mask in the projection path as shown and providing it with the proper type of drive system, it is possible to have a system which may be used to train pilots under all conditions of visibility using only one film.

Although the embodiment described shows the mask being used in a motion picture projector the invention would be equally useful in other types of film projection systems and in television projection system. Likewise, it may be used in vehicle simulators, other than aircraft simulators, such as ship, train, and automobile simulators and it is not the intention of the inventor to limit his invention to the embodiment shown.

I claim:

1. In combination with an aircraft simulator having a projection system wherein an image representing a portion of the real world is projected, a simulator of varible visibility conditions comprising:
   a. a fog mask having a density gradient in one dimension;
   b. movable support means mounting said fog mask, with said one dimension vertically oriented, in a plane perpendicular to the projection axis and in the path of the image prior to passage of said image through the projection lens of said system;
   c. a servo system operably coupled to said support means to translate said fog mask vertically so as to intersect any desired portion of said image path; and
   d. means for controlling said servo system to effect selective positioning of said mask as a function of the visibility conditions to be simulated, said controlling means including means for computing said visibility function from a selected value of visibility range and the value of simulated altitude of the aircraft simulator; and adjustable means for supplying to said computing means an input representative of said visibility range.

2. The combination of claim 1 wherein said servo system is a direct current position servo system.

3. The combination of claim 2 further including electrical limit means whereby said servo system is prevented from driving said holder past preset limits.

* * * * *